United States Patent
Maddison

(10) Patent No.: US 10,650,194 B2
(45) Date of Patent: *May 12, 2020

(54) METHOD AND SYSTEM TO AUTOMATICALLY CHANGE OR UPDATE THE CONFIGURATION OR SETTING OF A COMMUNICATION SYSTEM

(71) Applicant: Unify GmbH & Co. KG, Munich (DE)

(72) Inventor: Paul Maddison, Nottingham (GB)

(73) Assignee: Unify GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/382,799

(22) Filed: Apr. 12, 2019

(65) Prior Publication Data

US 2019/0243901 A1  Aug. 8, 2019

Related U.S. Application Data

(63) Continuation of application No. 14/678,076, filed on Apr. 3, 2015, which is a continuation of application No. 12/913,176, filed on Oct. 27, 2010.

(30) Foreign Application Priority Data

Oct. 29, 2009  (EP) ..................................... 09013603
Apr. 15, 2010  (EP) ..................................... 10004021

(51) Int. Cl.
*G06F 40/40* (2020.01)
*G06F 17/28* (2006.01)
(Continued)

(52) U.S. Cl.
CPC ............ *G06F 40/40* (2020.01); *H04L 51/043* (2013.01); *H04L 67/24* (2013.01); *H04L 67/22* (2013.01)

(58) Field of Classification Search
CPC ....................................................... G06F 17/28
See application file for complete search history.

(56) References Cited

U.S. PATENT DOCUMENTS

| 7,400,712 B2 * | 7/2008 | August | H04M 3/42153 379/88.01 |
| 7,787,749 B2 * | 8/2010 | Caspi | H04L 12/2803 386/232 |

(Continued)

FOREIGN PATENT DOCUMENTS

| JP | 2004318529 A | 11/2004 |
| JP | 2007506184 A | 3/2007 |

(Continued)

*Primary Examiner* — Michael N Opsasnick

(74) *Attorney, Agent, or Firm* — Buchanan Ingersoll & Rooney PC

(57) ABSTRACT

A method and device for automatically changing or updating a configuration or setting of a communication system is disclosed. In one aspect, the method includes providing information to the communication system, the information comprising natural human language, storing the information in a digital storage device, detecting a triggering event in the information, and changing the configuration or setting of the communication system automatically using a processor. The information is an input to the communication system, an input from at least one alternate communication system, or a combination of an input to the communication system and an input from the at least one alternate communication system.

20 Claims, 3 Drawing Sheets

(51) Int. Cl.
  *H04L 12/58* (2006.01)
  *H04L 29/08* (2006.01)

(56) References Cited

U.S. PATENT DOCUMENTS

| | | | | |
|---|---|---|---|---|
| 8,184,825 | B1* | 5/2012 | Riggs | H04B 1/202 |
| | | | | 381/86 |
| 8,595,008 | B2* | 11/2013 | Cho | G10L 15/32 |
| | | | | 704/231 |
| 8,620,667 | B2* | 12/2013 | Andrew | G10L 15/19 |
| | | | | 704/231 |
| 2003/0187646 | A1 | 10/2003 | Smyers et al. | |
| 2005/0038650 | A1 | 2/2005 | Bellegarda et al. | |
| 2005/0086255 | A1 | 4/2005 | Schran et al. | |
| 2005/0177732 | A1 | 8/2005 | Flom et al. | |
| 2006/0004571 | A1 | 1/2006 | Ju et al. | |
| 2006/0136221 | A1 | 6/2006 | James | |
| 2007/0050191 | A1* | 3/2007 | Weider | G10L 15/22 |
| | | | | 704/275 |
| 2007/0124143 | A1 | 5/2007 | Geller | |
| 2008/0091800 | A1 | 4/2008 | Sorrentino et al. | |
| 2008/0162259 | A1 | 7/2008 | Patil et al. | |
| 2008/0221892 | A1 | 9/2008 | Nathan et al. | |
| 2008/0301816 | A1* | 12/2008 | Ting | G06F 21/41 |
| | | | | 726/26 |
| 2009/0143052 | A1 | 6/2009 | Bates et al. | |
| 2009/0150373 | A1 | 6/2009 | Davis et al. | |
| 2009/0271514 | A1 | 10/2009 | Thomas et al. | |
| 2010/0036779 | A1 | 2/2010 | Sadeh-Koniecpol et al. | |
| 2010/0299615 | A1 | 11/2010 | Miluzzo et al. | |
| 2011/0004692 | A1 | 1/2011 | Occhino et al. | |
| 2011/0029608 | A1 | 2/2011 | Harple et al. | |
| 2011/0035452 | A1 | 2/2011 | Gittleman | |
| 2011/0047182 | A1 | 2/2011 | Shepherd et al. | |

FOREIGN PATENT DOCUMENTS

| | | |
|---|---|---|
| JP | 2008191748 A | 8/2008 |
| JP | 2009076043 A | 4/2009 |
| WO | 2009043020 A2 | 4/2009 |
| WO | 2009078148 A1 | 6/2009 |

* cited by examiner

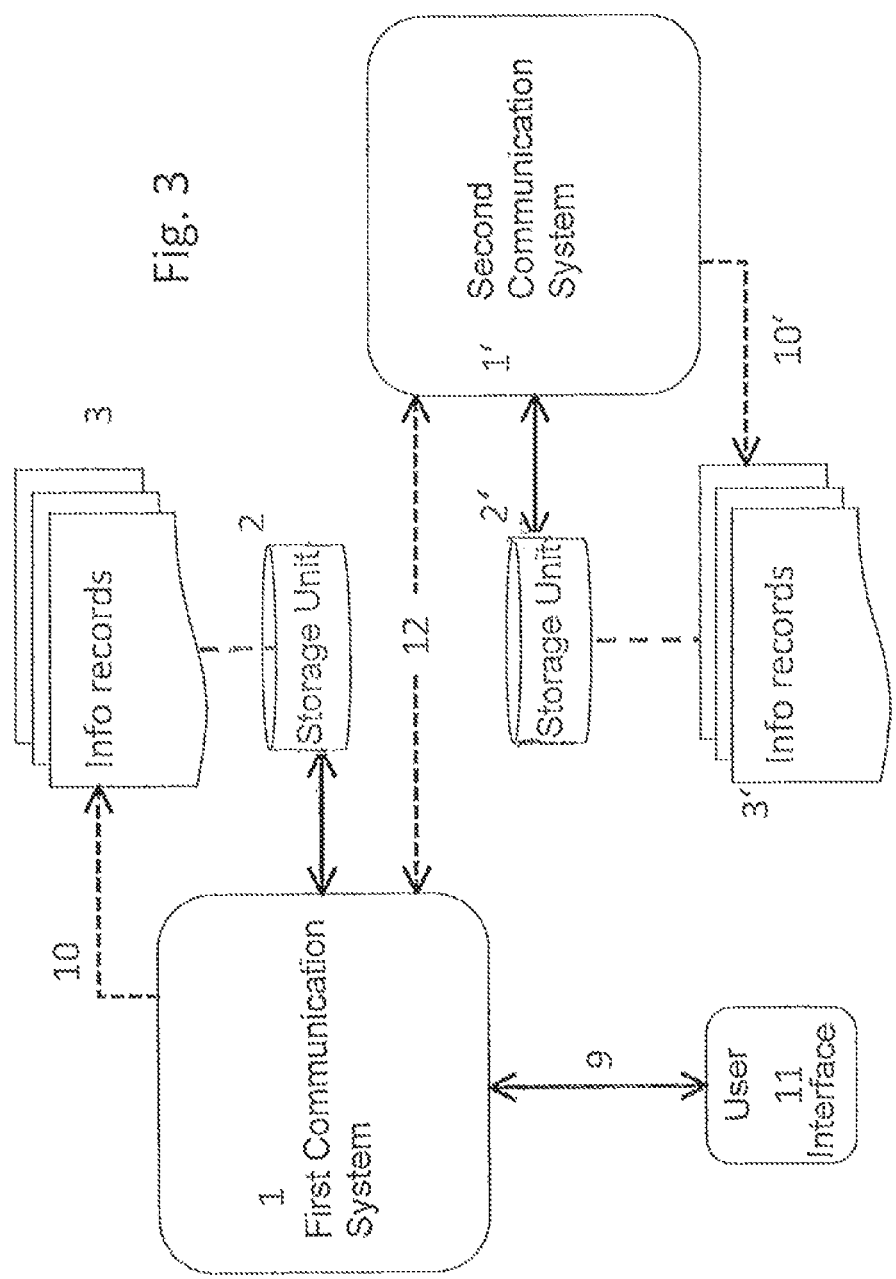

METHOD AND SYSTEM TO AUTOMATICALLY CHANGE OR UPDATE THE CONFIGURATION OR SETTING OF A COMMUNICATION SYSTEM

CROSS REFERENCE TO RELATED APPLICATIONS

This application is a continuation application of U.S. patent application Ser. No. 14/678,076, which is a continuation application of U.S. patent application Ser. No. 12/913,176, which claims foreign priority from European application No. EP09013603.7 filed on Oct. 29, 2009 and European application No. EP10004021.1, filed on Apr. 15, 2010. This application incorporates by reference both of those European applications herein in their entirety.

FIELD OF INVENTION

The present invention relates generally to a method and a system to automatically change or update the configuration or setting of a communication system.

BACKGROUND OF THE INVENTION

Different systems and methods are well-known in the art, providing various kinds of communication services. Examples of such systems are phone switching systems, instant messaging systems and so-called social media network systems, like e.g. Twitter, LinkedIn or Facebook. Among these, public, office, or private systems may be distinguished. All of these systems provide their special set of services based on their special representation of the end-user and its respective data base. The results are disjoint communications streams, characterized by a certain degree of user-unfriendliness due to e.g. multiple presence status fields to look after and to be manually maintained. Furthermore, if done very frequently during the day, starting calls and conferences manually may be experienced as a hassle by the user.

The goal of facilitating the use of such modern communication systems has been approached in the art by distributing numerous synchronization applications ("Sync Apps") to bridge information between different systems. As an example, the application "TwitterApp" for the Facebook service allows the Facebook status to be synchronized up with the Twitter status of user. Unfortunately, these kind of applications are restricted to merely translating a status information from one data base to the respective entry in the data base of another communication service. To further facilitate call set up, there are so-called click-to-call or click-to-conference applications available which however reside in only one of the many used communication systems.

SUMMARY OF THE INVENTION

The present invention aims at improving the facility of use of modern communication systems by providing a method and a device to automatically change or update the configuration or setting of a first communication system, the method using information gathered by the first communication system or information provided by a second communication system or both kinds of information. According to the invention, the used information comprises natural human language.

According to one embodiment of the present invention a method is disclosed for automatically changing or updating a configuration or setting of a communication system comprising providing information to the communication system, the information comprising natural human language, storing the information in a digital storage device, detecting a triggering event in the information, and changing the configuration or setting of the communication system automatically using a processor. The information is an input to the communication system, an input from at least one alternate communication system, or a combination of an input to the communication system and an input from the at least one alternate communication system.

In another embodiment of the present invention a device is disclosed for automatically changing or updating a configuration or setting of a communication system comprising a processor providing information to the communication system, the information comprising natural human language. The information is an input to the communication system, an input from at least one alternate communication system, or a combination of an input to the communication system and an input from the at least one alternate communication system. The device further includes a digital storage device storing the information, the processor detecting a triggering event in the information, and the processor automatically changing the configuration or setting of the communication system.

In the context of the present disclosure, the term of automatically changing or updating a configuration or a setting of a communication system covers all kinds of such changes or update processes, which are at least assisted, in many cases carried out completely by an information processing system, which preferably couples different disjoint communication systems together through intelligent and user-friendly means, preferably employing some kind of context sensitive trigger mechanism. This process of automatically changing or updating the configuration or setting of a communication system may be performed by using information gathered by the communication system to be changed or updated or by using information provided by another communication system or by employing both kinds of information in various kinds of combination.

The use information for changing or updating the configuration of setting of a communication system comprises natural human language of any kind or in any form, e.g. human speech recorded by sampling and converting acoustic signals to the digital domain or natural human language in the form of symbol sequences as e.g. text files, e-mails, short message services or parts of such information entities. Different kinds of natural human language, such as digital speech and text messages or parts thereof may be combined.

According to one preferred embodiment of the present invention, the first communication system gathers information by collecting status information or status change information from at least one server used by at least one second communication system. For example, the communication system Facebook has a feature called "status updates" (also referred to simply as "status") which allows users to post messages for all their friends to read. In turn, friends can respond with their own comments, and also press the "Like" button to show that they enjoyed reading it. A user's most recent status update appears at the top of their profile, and is also noted in the "Recently updated" section of a user's friend list.

Originally, the purpose of the feature was to allow users to inform their friends of their current "status" (i.e. their current feelings, whereabouts or actions) by referring to themselves in the third person (e.g. "George is happy" or "John is with Robert at his house"). However, users are no longer required to write in the third person.

Facebook originally prompted the status update with "User name is . . . " and Facebook users filled in the rest. Later on, the requirement to start a status update with "is" was removed. The question "What are you doing right now?" was introduced. In March 2009, the status update question was changed from "What are you doing right now?" to "What's on your mind?"

Later on, Facebook added the feature to tag certain friends (or groups etc) within one's status update by adding an @ character before their name, turning the friend's name into a link to their profile and including the message on the friend's wall. In 2009, the communication system Myspace also added a new status update feature. If a Myspace user has a Twitter account, the tweet will also update the Myspace status. Other leading social networking websites Facebook, MySpace, LinkedIn, and XING also have their own status update feature, also known as microblogging.

With the increasing use of microblogging, many users want to maintain presence in more than one social network. Services such as Lifestream and Profilactic will aggregate microblogs from multiple social networks into a single list. Services such as Ping.fm will send out your microblog to multiple social networks. Facebook has a similar feature. It does, however, require that the two accounts to be synchronized ("synched up together") by a corresponding synchronization action of a user or administrator.

According to the present invention, the use information for changing or updating the configuration of setting of a communication system comprises natural human language of any kind or in any form, e.g. human speech recorded by sampling and converting acoustic signals to the digital domain or natural human language in the form of symbol sequences as e.g. text files, e-mails, short message services or parts of such information entities. Different kinds of natural human language, such as digital speech and text messages or parts thereof may be combined.

According to another preferred embodiment of the present invention which may be combined with other embodiments of this invention, the first communication system gathers information by employing at least one keystroke listener running on at least one terminal device used by user of the first communication system.

According to another preferred embodiment, which may be combined with other embodiments of this invention, an expression matching step is performed with used natural human language data. In this way, expressions or groups of such expressions may be detected in used natural human language data and may be used to control subsequent actions which have been associated with such expressions.

According to another preferred embodiment which may be combined with other embodiments of the present invention, a step of extracting change or update information from the used natural human language data and a step of changing or updating the configuration or setting of the first communication system according to the extracted change or update information is performed during the method according to the present invention. In this way, expressions detected in the matching step or other expressions that may be associated with subsequent actions, such as change or update information may be extracted from the used natural human language data, and the configuration or setting of the first communication system may be changed or updated according to the extracted change or update information.

According to a further preferred embodiment of the present invention which may be combined with other embodiments of the invention, at least one communication action is performed by the first communication system, the action being triggered by a change or update of the configuration or setting of the first communication system according to information comprising natural human language used by the first communication system.

According to another preferred embodiment which may be combined with other embodiments of the invention, a learning algorithm based on a monitoring of correlated behavior of at least one user of at least one first or second communication system will be used as part of a method according to the present invention. The person skilled in the art knows various kinds of learning algorithms which may be used in this context. Examples of such learning algorithms may be so-called rule based learning algorithms or other kinds of adaptive algorithms which are suitable to adapt to correlations in the behavior of at least one user of at least one first or second communication system that may be observed by monitoring of such behavior.

According to another preferred embodiment which may be combined with other embodiments of a present invention, the learning algorithm comprises a discrete optimization algorithm, aiming at optimizing an objective function that represents at least certain aspects of the user-friendliness of at least one first or second communication system.

According to another preferred embodiment of the present invention which may be combined with other preferred embodiments, the discrete optimization algorithm is a stochastic optimization algorithm. Stochastic optimization (SO) methods are optimization algorithms which incorporate probabilistic (random) elements, either in the problem data (the objective function, the constraints, etc.), or in the algorithm itself (through random parameter values, random choices, etc.), or in both. The concept contrasts with the deterministic optimization methods, where the values of the objective function are assumed to be exact, and the computation is completely determined by the values sampled so far.

Partly-random input data arise in such areas as real-time estimation and control, simulation-based optimization where Monte Carlo simulations are run as estimates of an actual system, and problems where there is experimental (random) error in the measurements of the criterion. In such cases, knowledge that the function values are contaminated by random "noise" leads naturally to algorithms that use statistical inference tools to estimate the "true" values of the function and/or make statistically optimal or near optimal decisions about the next steps. Methods of this class include stochastic approximation, stochastic gradient descent, etc.

On the other hand, even when the data is exact, it is sometimes beneficial to deliberately introduce randomness into the search process as a means of speeding convergence and making the algorithm less sensitive to modeling errors. Further, the injected randomness may provide the necessary impetus to move away from a local solution when searching for a global optimum. Stochastic optimization methods of this kind include simulated annealing, stochastic hill climbing, evolutionary algorithms, genetic algorithms etc.

A genetic algorithm (GA) is a search technique increasingly used in computing to find exact (optimal) or approximate (near optimal) solutions to optimization and search problems. Genetic algorithms may be categorized as global search heuristics. Genetic algorithms may be regarded as a special subgroup of evolutionary algorithms (EA) that use techniques inspired by evolutionary biology such as inheritance, mutation, selection, and crossover. Genetic algorithms may be implemented in a computer simulation, in which a population of abstract representations (sometimes referred to as "chromosomes" or the "genotype of the genome") of candidate solutions (called "individuals", "creatures", or "phenotypes") to an optimization problem evolves toward "better" solutions.

Frequently solutions are represented in binary form as strings of 0s and 1s, but other encodings are also possible and commonly used. The evolution usually starts from a population of randomly generated individuals and usually happens in generations. In each generation, the "fitness" of every individual in the population is evaluated, multiple individuals are stochastically selected from the current population (based on their fitness), and modified (recombined and possibly randomly mutated) to form a new population. The new population is then used in the next iteration of the algorithm. Commonly, the algorithm terminates when either a maximum number of generations has been produced, or a satisfactory fitness level has been reached for the population. If the algorithm has terminated due to a maximum number of generations, a satisfactory solution may or may not have been reached.

According to another aspect of the present invention, a system, arrangement, apparatus or device performing a method or employed by a method according to one of the disclosed embodiments of the invention is provided.

According to a preferred embodiment, the invention is providing a context sensitive trigger mechanism, which couples different disjoint communication systems together through intelligent and user friendly means, especially by that of natural human language. The invention may be further illustrated by an example based on two well-known communication systems, namely Twitter and OpenScape.

In one example, in a Twitter post ("Tweet") a user types "I am out for lunch now", the action by the context sensitive trigger mechanism is then to change the OpenScape one number service to voice mail, e.g. to transfer the phone of the user automatically to his voice mail without requiring any further interaction by the user.

In another example, in a Tweet reply to several people, a user may post "We really need to have conference calls on this issue". In this case the action by the context sensitive trigger mechanism will be to set up automatically a voice conference in the OpenScape system including all people in the reply. The user now just needs to click on "start" to initiate the conference. If the user had typed " . . . need to have a conference now" or " . . . a conference at 2 pm" the context sensitive trigger mechanism would trigger the OpenScape system to initiate the conference call immediately without any further user interaction or send out an e-mail invitation for 2 pm.

In another example, a Tweet like, e.g. "I just landed in Boston" triggers the context sensitive trigger mechanism to activate the specific role profile in OpenScape which in this case would adapt the time of day routing rules to follow the right time zone.

A context sensitive trigger mechanism in the sense of the disclosure of the present invention may preferably use the following components:

A first useful component is the collection of the existing status change information from the servers used by the communication systems.

Through the application's programming interfaces (APIs) offered by most communication systems, namely e.g. the Twitter REST-full APIs or the Facebook APIs or "MySpace" APIs or any other blog status API, the context sensitive trigger mechanism calls or is notified about any activity or posting on the respective communication system. This listening process or service can run locally on the user's personal computer (PC) or centrally on a server, e.g. the OpenScape server.

An alternative but also preferred method to collect the desired information is to use a keystroke listener installed on the user's PC. This introduces the advantage of capturing all of the information inputted by the user, including information outside the communication systems. On the other hand it does not capture the information posted without the computer, e.g. a Tweet posted through an SMS from a mobile phone. Therefore, a combination of both methods may be preferable in some situations to capture both kinds of information.

A further useful component is some kind of e.g. iterative expression matching of certain key words inside the collected information.

The collected information, preferably collected as described before, is preferably continuously scanned through an expression matching algorithm, preferably in the following way: There may be a top level matching to look for the main content according to some key words, e.g. "conference", "call", "out", "lunch", etc. Then a context specific matching may be applied dependent on the found top level match, e.g. in the case of "conference" more specific information such as the time or the persons to be involved in the conference may be determined.

A further useful component is some kind of mapping and triggering of determined action to the communication representation of the user in the other communication system.

The desired actions, like the automated setting up of a conference is then preferably triggered by a context sensitive trigger mechanism by for example mapping the user data from the communication systems, which provided the information gathered, preferably according to the above disclosure, to the user representation in the user data base of the target communication system, where the desired action is to be performed and triggering the action through the interfaces provided by the target communication system.

A preferred embodiment of the invention may include the extension of communication user data base with the social network needed to be done up front (at setup of user). Other preferred embodiments of the invention may include a meta user data base service.

The keywords on top level or on the following context sensitive search level which have to be considered may be configured by an administrator. Such a configuration of the context trigger rules can be done in several ways.

Predefined match lists may be included in the context sensitive trigger mechanism by default, e.g. pre-programmed by the developers of the context sensitive trigger mechanism.

A user may have the option of self-configuration. In this case, the user can add, change or remove trigger rules.

A self-learning context sensitive trigger mechanism can detect automatically statistical correlations in the user's communication behavior, and based on that information suggest or create autonomously new trigger rules, e.g. in the case of Twitter and OpenScape UC the following scenario can be applied: A user, who regularly—after setting Twitter to follow person X—also adds the same person in his UC contact list, would be presented by the context sensitive trigger mechanism were the option to have a new context sensitive trigger rule stating that any Twitter follower setting action, automatically triggers the addition to the UC contact list.

In order to map the two different accounts and user data base entries of the same physical user in the involved communications systems, the context sensitive trigger mechanism needs to bridge these so far disjointed pieces of information. It needs to perform the federation of the user data between different communication systems. The context sensitive trigger mechanism therefore preferably uses the e-mail-address as common and unique identifier and scans regularly the respective data bases through their provided APIs.

Among the advantages of the invention disclosed so far, the following points deserve special attention. The invention facilitates to automate the creation of communication actions using triggers in natural language instead of machine commands or triggers from status information from advanced internet (web 2.0) services or social networking services, or triggers from personal Twitter posts or similar communication services.

Preferably, the context sensitive trigger mechanism not only transfers one piece of information from one communication system to another but interprets that information first based on some intelligence and then triggers the right associated behavior on the other communication system.

BRIEF DESCRIPTION OF THE FIGURES

FIG. 3 shows a change or update of the configuration or setting of a first and a second communication system according to some preferred embodiments of the present invention.

DESCRIPTION OF THE PREFERRED EMBODIMENTS

Figure 1:
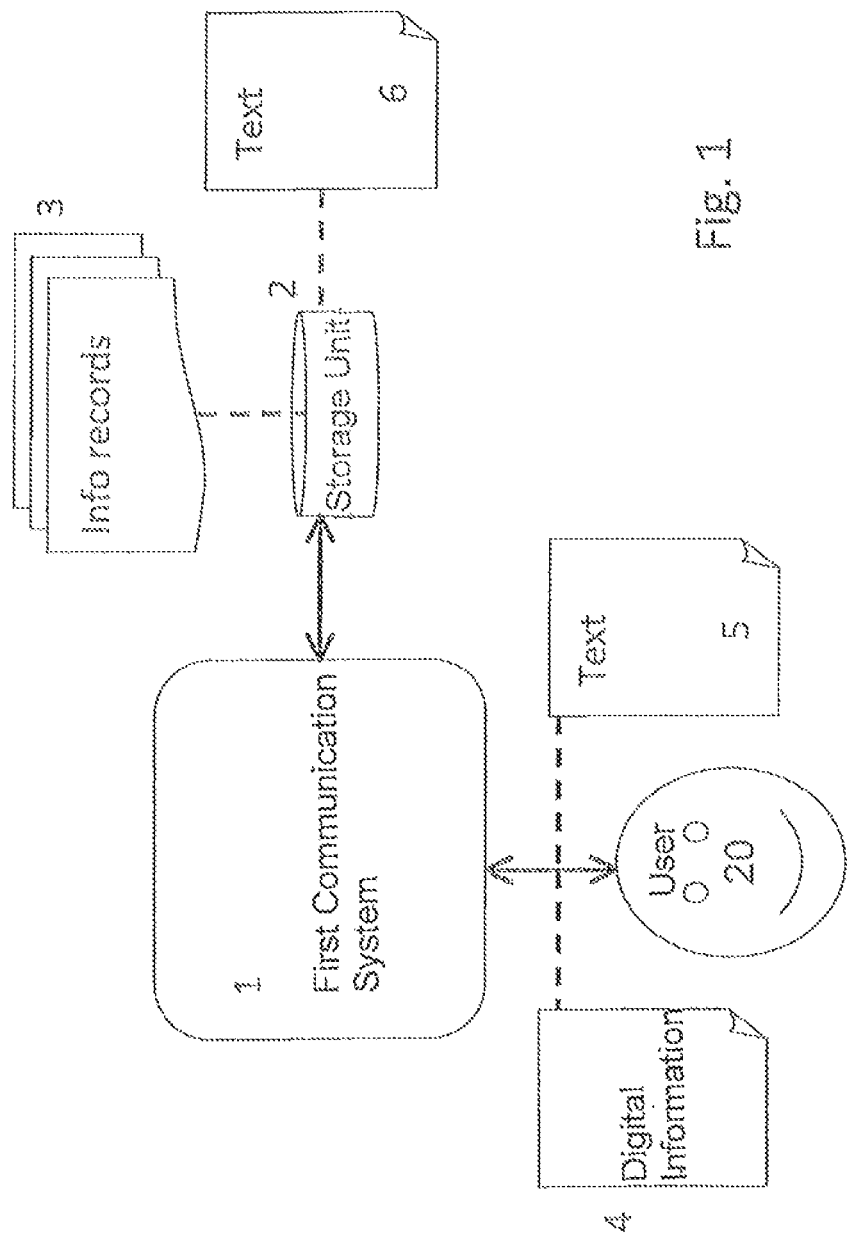
FIG. 1 shows a first communication system.

As illustrated by FIG. 1, a user 20 inputs information 4, 5 into a first communication system 1 or receives such information from this communication system. The information input or the information received by the user 20 may comprise all kinds of information, including but not limited to texts 5 or other digital information 4, like e.g. speech data, digital images, etc. The information may be provided through a user interface 11 shown in FIG. 2, wherein the user interface may include a microphone, a keyboard, or other communication input system. The information 6 input into or received from the first communication system 1 will in general be stored in a digital storage device 2. Also stored in some digital storage device 2 of the first communication system 1 will in general be some kind of configuration or setting information in the form of some kind of information records 3, including status information and other user specific information.

Figure 2:
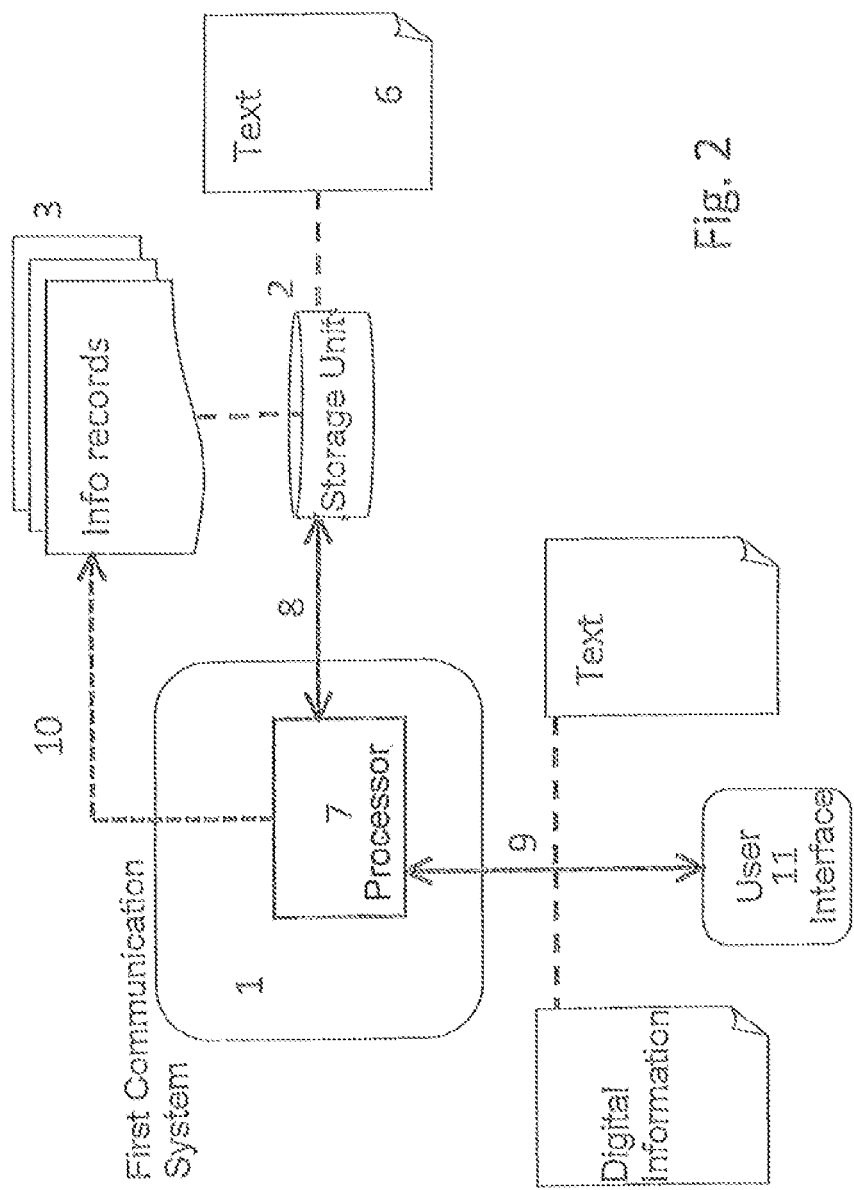
FIG. 2 shows a change or update of the configuration or setting of a first communication system according to some preferred embodiments of the present invention.

The automatic change or update of the configuration 3, or setting of the first communication system 1, uses e.g. information 9 gathered by the first communication system, as shown in FIGS. 1 and 2 or information 12 provided by a second communication system 1', as shown in FIG. 3, or both kinds of information, and the used information comprises natural human language. The automatic change or update is done by some information processing means 7, e.g. a processor of one of the communication systems involved or a processor in a user device connected to one of the communication systems involved. The information processing means 7 analyses the natural human language information, preferably by employing an expression matching step performed with used natural human language data and preferably by extracting change or update information from the used natural human language data.

Upon detection of a triggering event in the communication streams 9, 12, a context sensitive trigger mechanism may preferably trigger 10, 10' an update of the configuration 3, 3' or setting by suitably changing the contents of the corresponding information records in at least one of the storage devices 2, 2' of at least one of the communication systems 1, 1' involved.

The invention has been described in preferred embodiments and complemented with supporting figures, but is not limited thereto. Those skilled in the art will recognize that a number of additional modifications and improvements can be made to the invention without departure from the essential spirit and scope. The scope of the invention should only be limited by the appended set of claims.

I claim:

1. A method for automatically changing or updating a configuration or setting of a communication system comprising:
   providing first information to the first communication system via a first user interface, the information comprising natural human language posted via use of the first user interface of the first communication system, the first communication system configured to provide a first service to a user of the first user interface via a communication connection with a first device of the user;
   storing the first information in a storage device;
   detecting at least one context sensitive trigger in the first information via at least one context trigger mechanism based on the natural human language of the first information;
   associating a change in a configuration or setting information of a second communication system that is configured to provide a second service to a user of the first user interface with the at least one detected context sensitive trigger, the second service being providable via a communication connection between the second communication system and the first device;
   changing the configuration or setting information of the second communication system automatically in response to the detected at least one context sensitive trigger using a processor to initiate the changing of the configuration or setting information via a server of the second communication system where the changing of the configuration or setting information is a change associated with the detected context sensitive trigger.

2. The method of claim 1, further comprising gathering the first information by collecting status information from at least one server of the first communication system that communicates with the first device of the user for the device to utilize services offered by the first communication system, the first service offered by the first communication service comprising at least one social media service.

3. The method of claim 1, further comprising the second communication system gathering information by employing at least one keystroke listener running on at least one terminal device of the user that is utilized to communicate with the second communication system, the at least one terminal device comprising the first device of the user.

4. The method of claim 3, further comprising matching an expression contained in the first information with natural human language data and extracting matched human language information; and
- wherein the changing of the configuration or setting information of the second communication system is based on the matched human language information.

5. The method of claim 1, wherein the first communication system hosts a first social media network service and the second communication system hosts a second social media network service, the first service includes the first social media network service and the second service includes the second social media network service.

6. The method of claim 5, further comprising the second communication system performing at least one communication action, the communication action being triggered by the change of the configuration or setting of the second communication system according to the matched human language information.

7. The method of claim 1, wherein the context sensitive trigger mechanism uses an address as an identifier for the user and regularly scans database entries for the first and second communication systems to detect at least one context sensitive trigger.

8. The method of claim 7, wherein the processor utilizes a learning algorithm based on a monitoring of correlated behavior of the user, the learning algorithm being a discrete optimization algorithm or a stochastic optimization algorithm.

9. The method of claim 1, wherein the processor is a processor of the first device, the first device being communicatively connectable to the first communication system and the second communication system, the first device configured to generate the first user interface for display of the first user interface on the first device; and
- wherein the first communication system hosts a first social media service and the second communication system hosts a second social media service, the first service including the first social media network service and the second service including the second social media network service.

10. The method of claim 1, wherein the processor is a processor of the first communication system, a processor of the second communication system, a processor of the first device, a processor in a user device connectable to the first and second communication systems, or a processor in a user device connected to the first and second communication systems.

11. A device for automatically changing or updating a configuration or setting of a communication system comprising:
- a processor configured to provide first information to a first communication system that hosts a first social media service, the information comprising natural human language posted via a user interface for the first communication system;
- at least one storage device that stores the first information;
- the processor configured to detect a context sensitive trigger in the first information and associates a change in configuration or setting of a second communication system configured to provide a service to a user of the user interface with the detected context sensitive trigger via a context trigger mechanism; and
- the processor configured to automatically change the configuration or setting of the second communication system, such change being the change associated with the detected context sensitive trigger.

12. The device of claim 11, wherein the processor gathers the information by collecting status information from at least one server of the communication system.

13. The device of claim 11, wherein the processor gathers information by employing at least one keystroke listener running on the device.

14. The device of claim 11, wherein the device is a terminal device and the processor matches an expression contained in the first information with natural human language data and extracts matched human language information.

15. The device of claim 14, wherein the processor changes the configuration or setting of the second communication system according to the matched human language information, the second communication system hosting a social media service.

16. The device of claim 15, wherein the change to the configuration or the setting of the second communication system is configured to cause the second communication system to perform at least one communication action, the communication action being triggered by the change of the configuration or setting of the second communication system according to the matched human language information.

17. The device of claim 11, wherein the processor has a learning algorithm based on a monitoring of correlated behavior of at least one user of the communication system.

18. The device of claim 17, wherein the learning algorithm is a discrete optimization algorithm or a stochastic optimization algorithm.

19. The device of claim 11, wherein the device is a user device that is connectable to the first communication system and the second communication system and that generates the user interface for display of the user interface; and
- wherein the second communication system hosts a second social media service.

20. A communication system comprising:
- a first communication system that hosts a first service;
- a second communication system that hosts a second service, wherein the first service is a social media service and/or the second service is a social media service; and
- a user device connected to the first and second communication systems;
- the user device sending first information to the first communication system, the first information comprising natural human language;
- the user device configured to detect a context sensitive trigger from the natural human language of the first information via a context sensitive trigger mechanism and updating configuration or setting information of the second communication system based on the detected context sensitive trigger within the first information; and
- the second communication system configured to initiate a communication action in response to the change to the configuration or setting information.

\* \* \* \* \*